United States Patent Office 3,030,339
Patented Apr. 17, 1962

3,030,339
N-VINYL-2-OXAZINIDINONE COMPOUNDS
William F. Tousignant, Wilhelm E. Walles, and Thomas Houtman, Jr., Midland, Mich., assignors to The Dow Chemical Company, Midland, Mich., a corporation of Delaware
No Drawing. Filed Mar. 27, 1958, Ser. No. 724,271
9 Claims. (Cl. 260—77.5)

The present invention is germane to the organic chemical arts. It has more pertinent reference to certain N-vinyl-2-oxazinidinone compounds, which are new and useful monethylenically unsaturated monomeric substances, and to various derivatives thereof, particularly polymeric and resinous products that have great utility and provide for many benefits and advantages in numerous applications. The invention is also concerned with the preparation of the indicated N-vinyl-2-oxazinidinone compounds.

One basic object of the invention is to provide, as new compositions of matter, N-vinyl-2-oxazinidinone compounds that contain the characterizing unit or group

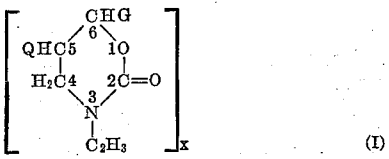

(I)

wherein Q is selected from the group consisting of hydrogen and methyl; G is selected from the group consisting of hydrogen, methyl, ethyl, propyl, butyl (i.e., alkyl radicals containing from 1 to about 4 carbon atoms), monohaloalkyl radicals containing from 1 to about 4 carbon atoms (i.e., chloromethyl, chloroethyl, and analogous fluoro-, bromo- and iodo- alkyls, etc.), and aryl radicals containing from 6 to about 10 carbon atoms (i.e., phenyl, alkyl substituted phenyl, etc.); and "$x$" has a numerical value of at least 1. As is apparent, the compounds of the present invention may also be identified as 3-vinyl-2-oxazinidinones.

A particular object is to provide monomeric N-vinyl-2-oxazinidinone compounds of the indicated varieties that are characterizable in having the generic structure:

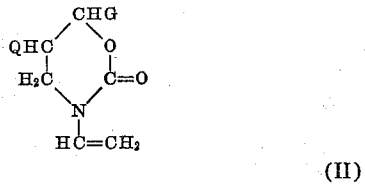

(II)

wherein Q and G are as above defined.

A specific object is to provide monomeric N-vinyl-2-oxazinidinone, hereafter referred to for convenience and simplicity as VOZ, which is of the structure according to Formula II wherein both Q and G are hydrogen (i.e., a non-ring-substituted compound of the contemplated variety).

A related object is to provide an advantageous method for the manufacture of monomeric compounds of the indicated varieties, particularly VOZ.

A further object, and one that is of considerable importance, is to provide polymeric products, including homopolymers and various copolymers, that are derived from the N-vinyl-2-oxazinidinone monomers of the indicated varieties especially those derived from VOZ, whose homopolymer is hereinafter referred to as PVOZ.

An associated object of the invention is to provide methods for the preparation of polymeric N-vinyl-2-oxazinidinone compounds of the indicated varieties.

According to the present invention, the new monomeric compounds which possibilitate the achievement of the above indicated and cognate objects (including the formation of new polymeric products) are of the general structure of Formula II. A great number of the monomeric N-vinyl-2-oxazinidinone compounds are ordinarily clear, colorless liquids at, or at least near, normal room temperatures. Some of the monomers, however, particularly the aryl (such as phenyl) ring-substituted derivatives, are normally solid, meltable substances. They are ordinarily soluble in water and lower aliphatic alcohols, such as methanol, ethanol, propanol and many other organic solvents. This is generally true for VOZ and the lower alkyl (such as methyl) ring-substituted species. Bulkier substituent units (such as phenyl) often tend to diminish the water-solubility of the monomeric N-vinyl-2-oxazinidinone compounds.

For example, VOZ is a clear, actually water-white liquid at room temperature which is water-soluble as well as being soluble in methanol, ethanol, styrene, diethylene glycol, 2-pyrrolidinone (sometimes called 2-pyrrolidone), chlorofrom, dimethyl formamide, nitromethane, acetic acid, aniline, ethylene carbonate, the dimethyl ethers of di-, tri-, or tetraethylene glycol, dimethyl sulfoxide, and the like. VOZ is insoluble in such solvents as cyclohexanol, hexane, kerosene and mineral oil. Under an absolute pressure in the range from about 1 to 2 mm. Hg, pure VOZ boils at temperatures between about 100° and 110° C. Thus, under an absolute pressure of about 1.4 mm. Hg, VOZ of near absolute purity boils at about 103° C. Of course, the degree of purity of the monomer may tend to alter the boiling point of the material to some extent. Monomeric VOZ has a refractive index, taken at 25° C., of about 1.5063 and a specific gravity, taken at 25° C. and corrected to 4° C., of about 1.1381. Upon infrared analysis, the monomeric compounds exhibit the characteristic absorption bands that are obtained when N-vinyl groups and

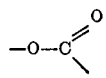

structural formations are present.

The monomeric N-vinyl-2-oxazinidinone compounds of the Formula II are usually relatively unstable upon exposure to light, particularly sunlight. Generally, the unstabilized monomers become discolored to a very light shade of yellow within several days of continued exposure to light. However, when they are kept in the dark, particularly when they are maintained under an atmosphere of nitrogen, their natural stability is good. Thus, the monomeric N-vinyl-2-oxazinidinone compounds may be stored safely for prolonged periods when maintained so as to be protected in the indicated manner. The monomeric compounds react with solutions of bromine in chloroform, as evidenced by rapid discoloration of the halogen solution, due to the bromination of the vinyl groups in the monomers. Dilute solutions of potassium permanganate and the like reagents rapidly oxidize the vinyl groups of monomeric N-vinyl-2-oxazinidinone compounds.

The monomeric N-vinyl-2-oxazinidinone compounds of Formula II may advantageous be prepared by a procedure which involves the transvinylation of 2-oxazinidinones with an alkyl vinyl ester under the influence of certain catalysts, such as mercuric acetate ($HgAc_2$). The alkyl (including cycloalkyl) vinyl ether that is employed may contain from 1 to about 10 carbon aoms or so in the alkyl radical. Ethyl vinyl ether, n-butyl vinyl ether, ethyl cyclohexyl vinyl ether and the like are typical of the alkyl vinyl ethers that may be employed satisfactorily for the transvinylation reaction. A transvinylation for preparation of the monomers of the invention is represented by the following equation, using 2-oxazinidinone and ethyl vinyl ether for purposes of specific illustration:

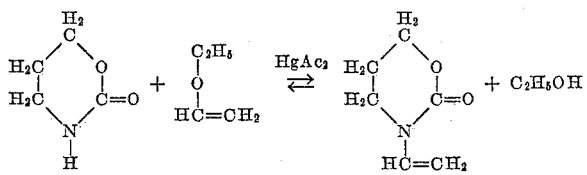

Some acetal by-products are also usually obtained in the reaction. Other catalysts, including mercuric benzoate, zinc acetate, phenyl mercuric acetate and the like may be employed in place of or in combination with the mercuric acetate. Generally, an amount of the catalyst up to about 5 to 10 percent by weight, based on the weight of the reactant starting 2-oxazinidinone material, may be required for the accomplishment of the transvinylation. Frequently, only 1 percent or less of the catalyst may be found to be required. Usually, relatively greater quantities of the catalyst are necessary to employ when the reaction is performed by batch-wise techniques instead of according to continuous processing arrangements.

It is desirable (though not an absolute necessity) for the transvinylation reaction to be conducted in a solvent vehicle that is free from substituent hydroxy groups (such as dioxane, dimethyl formamide and the above-mentioned ethers of ethylene glycols and the like) and for the reaction mass to be maintained under an atmosphere of an inert gas, such as nitrogen, during the course of reaction. The latter technique, however, is likewise not an absolute requirement. The reaction may be performed with benefit at temperatures from about 110° to 170° C., or so. Better results may often be obtained when the temperature of reaction is maintained between about 140° and 160° C. The reaction will occur under any desired pressure although, when it is being conducted in autoclaves and the like apparatus, especially when solvent vehicles are employed, it is most convenient to accomplish the transvinylation under autogenous pressures. Ordinarily, good conversions and yields of desired product from the converted starting materials can be realized according to the transvinylation method within reaction periods of twenty-four hours or less. By way of illustration, conversions in the neighborhood of 40–50 percent and greater and yields of from 80–90 percent and higher are easily possible to attain. The desired monomeric N-vinyl-2-oxazinidinone products can be recovered with little difficulty from the reaction mass using procedures that will be readily apparent to those who are skilled in the art. Thus, fractional distillation, solvent extraction, precipitation and/or stripping techniques can be employed for product isolation, depending upon the exigencies of specific situations.

The monomeric compounds of Formula II may also be prepared with advantage by a direct method which comprises mixing a starting 2-oxazinidinone with a suitable catalyst or catalyst-forming material, such as an alkali metal or alkaline earth metal hydroxide or alcoholate or an elemental alkali metal to form a salt of the 2-oxazinidinone; then subjecting the catalyzed mixture to the action of acetylene under an elevated pressure at an elevated temperature until at least a portion of the starting material is converted to the desired monomeric product.

The N-vinyl-2-oxazinidinone monomers will undergo polymerization in mass (which is oftentimes referred to as bulk polymerization) as well as polymerization, at practically any level of concentration, in aqueous or other solution or in emulsion or other dispersion in liquids with which the particular monomer or monomers being polymerized is or are not at all soluble or only partially soluble. It is ordinarily beneficial for the polymerization to be conducted at a temperature between about 50° and 100° C., although this may vary with the particular catalyst, monomer, and solvent or carrier, if any, used and the type of reaction being conducted. Suitable catalysts or initiators for polymerization of the monomeric N-vinyl-2-oxazinidinone compounds include the azo catalysts, such as $\alpha,\alpha'$-azobisisobutyronitrile, peroxygen catalysts, such as hydrogen peroxide, lauroyl peroxide, benzoyl peroxide, potassium persulfate and the like, and ionic catalysts such as boron trifluoride-ether complex, as well as irradiation under the influence of high energy fields. The latter catalyzation may include the various actinic radiations, including such diverse forms of catalysis as ultraviolet, X-ray and gamma radiations from radioactive materials (i.e., cobalt-60, cesium-137, etc.) and high energy electron beams generated from linear accelerators, resonant transformers, electrostatic generators, and the like. Frequently, the monomeric N-vinyl-2-oxazinidinone compounds will undergo thermal polymerization without using catalyzing or initiating agents by simply heating them in air at a temperature of 100° C. or so. If desired, thermal mass polymerization may also be accomplished under blanket of an inert gas, such as nitrogen.

Copolymers of various monomeric N-vinyl-2-oxazinidinone compounds of the Formula II, particularly VOZ, with one another and other monomeric substances copolymerizable therewith may be prepared in ways analogous to those described in the foregoing, including suspension and emulsion polymerization techniques. To such ends, monoethylenically unsaturated monomers such as styrene, vinyl toluene, acrylonitrile, vinyl chloride, vinyl fluoride, vinylidene chloride, methyl acrylate, ethyl acrylate, methyl methacrylate, ethyl methacrylate and other monomeric acrylate and methacrylate compounds, vinyl acetate, vinyl propionate and the like ethenoids (generally characterizable in containing a $CH_2=C<$ grouping), including the N-vinyl lactams such as N-vinyl-2-pyrrolidinone, the several N-vinyl-2-oxazolidinones such as N-vinyl-2-oxazolidinone, N-vinyl-5-methyl-2-oxazolidinone, etc., N-vinyl-3-morpholinone and so forth. Besides those mentioned in the foregoing, other monomers that may be employed suitably for the preparation of copolymerized N-vinyl-2-oxazinidinones, especially for copolymerized VOZ products, include those that have been disclosed and delineated in United States Letters Patent No. 2,818,362.

When copolymers are prepared, it is frequently desirable for the monomeric N-vinyl-2-oxazinidinone compound that is employed [or for a mixture of such monomers of the Formula II] to constitute at least about 10 percent by weight of the mixture of copolymerizable materials, e.g., from 10 to 90 or 95 or even as high as 99 percent by weight of such a mixture.

The N-vinyl-2-oxazinidinone polymers, including PVOZ, may advantageously be prepared as high polymers having a number average molecular weight, for example, in the range from 10 to 100–200 thousand and higher (as determinable from Fikentscher K-values of about 5–10 or more to as high as 75 to 100 or so) and a structural arrangement containing recurring polymerized units that may be depicted in the following way:

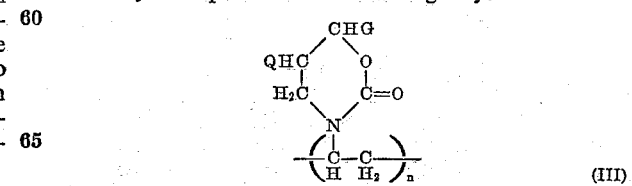

wherein Q and G are as above defined and $n$ is a plural integer, preferably one whose numerical value is greater than 5 or 10 to 50 or so and which may be as large as 1,000–2,000 or more. The hydrogen (or other terminal units) which occur in homopolymeric and other polymeric compositions are not shown in Formula III since such details are readily understood by the artisan. Of course, lower and higher molecular weight polymers can also be prepared. It should be taken into account in connection with the above mentioned "number average" molecular weight ranges that the indicated numerical values depend upon the peculiarities of the method of expression which is employed for such statistic. Much higher values, especially in the higher ranges, are equally accurate when the molecular weight is otherwise expressed. Thus, according to the commonly used concept of "weight average" molecular weight [as defined by Frank and Levy, Journal of Polymer Science, 10, 371–8 (1953)], the molecular weight of the polymers, especially in the higher ranges, are significantly larger. In any event, the indicated molecular weight values as well as the value of $n$ are intended to be more approximate averages rather than discrete limits.

Generally, the poly-N-vinyl-2-oxazinidinones are hygroscopic, water-soluble materials. They can usually be obtained as light to white colored, free-flowing powders that are ordinarily of an amorphous, non-crystalline nature, as indicated by X-ray analysis. When the polymers are burned, they ordinarily leave a sponge-like residue which tends to indicate the evolution of carbon dioxide during thermal decomposition. As might be expected, the densities, softening points, fusing and melting temperatures and gas evolution points of the individual poly-N-vinyl-2-oxazinidinones are found to vary with particular species of the homopolymers and copolymers thereof.

The poly-N-vinyl-2-oxazinidinones can generally be molded under pressure at temperatures between about 125° and 175° C. to produce clear, hard and brittle or glass-like structures, many of which are water-soluble.

Because of their excellent affinity for many of a wide variety of dyestuffs (including direct, basic, acid, vat and other classes of dyes), the poly-N-vinyl-2-oxazinidinones, particularly PVOZ, can ordinarily be employed with great benefit as dye-assisting adjuvants or dye-receptors for synthetic textile fibers and other shaped articles of normally difficult-to-dye synthetic polymers in which the poly-N-vinyl-2-oxazinidinones may be incorporated. In this capacity, they may be utilized with exceptional benefit in connection with fiber-forming compositions and filamentary shaped articles produced therefrom of the various acrylonitrile polymers, particularly polyacrylonitrile. Besides such desirable utility, certain of the poly-N-vinyl-2-oxazinidinones, especially PVOZ, exhibit additional utilities of unusual attractiveness. For example, PVOZ and certain other of the poly-N-vinyl-2-oxazinidinones of the Formula III may be employed with advantage in wave or curl setting formulations or compositions for human hair; as dye-stripping agents for textile goods and as other varieties of textile assistants; for beverage clarification purposes and in numerous other applications.

The invention is further illustrated in and by the following examples wherein, unless otherwise indicated, all parts and percentages are to be taken by weight.

EXAMPLE "A" PREPARATION OF VOZ

About 101.0 grams (1.0 mole) of 2-oxazinidinone (M.P. 78–80° C.); 216 grams (3.0 moles) of ethyl vinyl ether (B.P. 36° C.); 76.0 grams of dioxane (B.P. 101° C.) as a solvent; and 6.0 grams of mercuric acetate as a catalyst were charged to a 1.5 liter rocking autoclave and first flushed, then blanketed therein, with nitrogen. The charged ingredients were then heated to a temperature of about 155° C. and syntermally maintained thereat for a period of about 12 hours, after which period the reaction was terminated. After termination of the reaction, the reaction mass was permitted to cool to room temperature for an 8-hour period. After cooling, the reaction mass was filtered to recover about 59 grams of unreacted 2-oxazinidinone in reusable condition. The remaining dark colored liquid was then subjected to distillation in a flash still wherein all of the low boiling solvent and the unused ethyl vinyl ether were removed at 90° C. under 5 mm. Hg absolute pressure. The residue was vacuum distilled. About 22.0 cc. of lightly colored liquid was collected at 98° C./1 mm. Hg. Iodine titration of this fraction indicated it to be about 85.6 percent pure monomeric VOZ. A residue of about 23 grams remained after the flash distillation. Thus a conversion of about 41.5 percent of the 2-oxazinidinone was obtained with a consequent yield, based on converted 2-oxazinidinone, of about 57 percent.

The foregoing procedure was duplicated to prepare a sample of monomeric VOZ of about 94.3 percent purity. The monomer was a water-white liquid that was soluble in water and lower alkyl alcohols from $C_1$ to $C_4$. Its properties were as follows:

| | |
|---|---|
| B.P. | 103° C./1.4 mm. Hg. |
| $N_d^{25}$ | 1.5063. |
| $D_4^{25}$ | 1.1381. |
| Percentage N: Calculated | 11.03. |
| Found | 10.66. |

Similar results are obtained when the foregoing is repeated with 5-methyl-2-oxazinidinone; 6-methyl-2-oxazinidinone; 6-ethyl-2-oxazinidinone; 6-chloromethyl-2-oxazinidinone; 6-phenyl-2-oxazinidinone; and the like to prepare corresponding N-vinyl-2-oxazinidinone monomers and when other related starting materials are used to make other monomers within the scope of the Formula II. Direct vinylation with acetylene also provides good results in preparation of the monomers.

EXAMPLE "B" PREPARATION OF PVOZ

Into a resin flask, equipped with a thermowell, stirrer, condenser and nitrogen sparger there was charged about 96.0 grams of VOZ in a 30 percent aqueous solution and 0.27 gram of $\alpha,\alpha'$-azobisisobutyronitrile catalyst. Nitrogen was then sparged through the solution. The polymerization was conducted at 76–77° C. with stirring for 12 hours. At the end of this period, a viscous, water white solution remained.

The PVOZ product was isolated from the solution by adding thereto an excess of an equal weight mixture of diethyl ether and isopropanol. This caused a slurry to precipitate to the bottom of the flask. The ether/isopropanol mixture and water was then decanted to leave a relatively slimy precipitate which was then dissolved in isopropanol. The resulting isopropanol solution was added with continued stirring to a large excess of an equal weight mixture of acetone and diethyl ether, whereupon the PVOZ was caused to precipitate. The polymer product was filtered and air dried. The finally obtained PVOZ was a white, non-crystalline, free-flowing, water-soluble powder. Its Fikentscher K-value was about 59.3 and its molecular weight (number average) on the order of 150,000.

The PVOZ was found to have the following additional properties:

| | |
|---|---|
| M.P. (Fisher Johns apparatus). | 270° C. (slight fusing), 300° C. (fused, light brown, no decomposition). |
| No cloud point up to 100° C. in 1 percent aqueous solution. | |
| Density at 25° C. | 1.357 grams per cubic centimeter. |
| Theoretical density | 1.35 grams per cubic centimeter (as calculated according to the Van Krevelen method for amorphous high polymers, reported in "Brennstoff-Chemie," 33, p. 260 [1952]. |
| Soluble in | Water, Methanol, Isopropanol, Methylene Chloride, Chloroform. |
| Insoluble in | Diethyl ether, Acetone, Benzene, Dioxane, Cyclohexanol. |

Under a plate pressure of about 30,000 pounds per square inch at 160° C., the PVOZ product was compression molded to a clear, brittle, water-soluble film useful for fugitive protection and also for the preparation of synthetic optical elements. The PVOZ also adheres with good tenacity when applied as a coating (as by casting a film on the surface) on glass and the like.

Similar results are obtained when the foregoing is repeated in order to prepare such polymers as poly-N-vinyl- 5-methyl-2-oxazinidinone; poly-N-vinyl-6-methyl-2-oxazinidinone; poly-N-vinyl-6-ethyl-2-oxazinidinone; poly-N-vinyl-6-chloromethyl-2-oxazinidinone; poly-N-vinyl-6-phenyl-2-oxazinidinone; and other of the homopolymers of Formula III, using appropriate starting monomers for their prepartion.

EXAMPLE "C" COPOLYMERS OF VOZ

Copolymers of VOZ and other of the N-vinyl-2-oxazinidinone monomers of the Formula II with such monomers as styrene, acrylonitrile, vinyl acetate, vinyl chloride, vinylidene chloride, N-vinyl-2-pyrrolidinone and the like are readily prepared by following conventional copolymerization techniques for preparation of the desired copolymeric product. Many of such copolymers have advantageous uses similar and analogous to those of the homopolymeric N-vinyl-2-oxazinidinones.

Several copolymers of VOZ with various comonomers were prepared in a series of experiments. In each of the tests about 5 drops of VOZ were placed in a four-inch test tube along with another monomer and a pinch (in appropriate catalyzing proportion) of $\alpha,\alpha'$-azobisisobutyronitrile. The charged tubes were then stoppered and placed in a water bath at 70° C. the results and characteristics of the copolymer products obtained are set forth in the following tabulation:

| Sample | Comonomer | Polymerization Time, Min. | Copolymer Characteristics |
|---|---|---|---|
| "C1" | Styrene | 180 | Colorless, clear, viscous liquid, partly water-soluble. |
| "C2" | N-vinyl-2-pyrrolidone | 5-6 | Colorless, clear, hard, brittle, water-soluble. |
| "C3" | N-vinyl-5-methyl-2-oxazolidinone | 5-6 | Colorless, clear, hard, brittle, water-soluble. |
| "C4" | Vinyl Acetate | 5-6 | Colorless, clear, gummy solid, water-soluble. |
| "C5" | n-Butyl Methacrylate | 20 | Colorless, slightly opaque, viscous liquid, water-insoluble. |
| "C6" | Acrylic Acid | 5-6 | Dark red, clear, hard, brittle, partly water-soluble. |
| "C7" | Methacrylic Acid | 5-6 | Opaque, white, hard, brittle, partly water-soluble. |
| "C8" | Acrylonitrile | 5-6 | Colorless, clear, hard, brittle, partly water-soluble. |

EXAMPLE "D" USE OF PVOZ

A polyacrylonitrile fiber is obtained in a water-hydrated or aquagel condition in which it contains about 2 parts of water to each part of polymer therein. The aquagel, which is oriented by wet stretching after extrusion, is obtained in a known manner by salt-spinning a solution containing about 10 percent of fiber-forming polyacrylonitrile in a 60 percent aqueous zinc chloride solvent therefor into an aqueous coagulating bath containing about 42 percent of zinc chloride. The aquagel fiber is immersed at room temperature in a 3 percent aqueous solution of PVOZ having a Fikentscher K-value of about 60 until about 10 percent (on the dry weight of the resulting fiber product) of the PVOZ is incorporated therein. After the impregnation, the fiber product is dried at about 150° C. for 30 minutes to convert it to a hydrophobic form. It is found to be readily dyeable to deep and level shades of coloration upon a 4 percent dyeing in the conventional manner with Calcodur Pink 2BL, a direct dyestuff having the Colour Index 353. The PVOZ-containing fiber product is also readily and excellently dyeable with such dyestuffs as Sevron Brilliant Red 4G (formerly known as Basic Red 4G—no Colour Index), a basic dyestuff; Amacel Scarlet BS, an acetate dyestuff (American Prototype No. 244); Calcocid Alizarine Violet, an acid dye (Colour Index 1080) and the like.

Excellent results similar to those demonstrated in the foregoing can also be obtained with other of the N-vinyl-2-oxazinidinone polymers of the Formula III and copolymers containing such recurring units, and when the polymeric products are utilized for such purposes as dye-stripping agents, for clarifying such beverages as beer and wine, in hair setting formulations, and in numerous other applications.

What is claimed is:

1. An N-vinyl-2-oxazinidinone compound having the empirical formula:

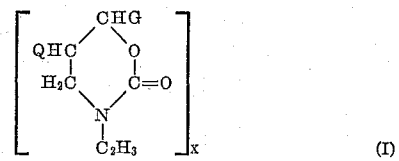

(I)

wherein Q is selected from the group consisting of hydrogen and methyl; G is selected from the group consisting of hydrogen, alkyl from 1 to 4 carbon atoms, monohaloalkyl from 1 to 4 carbon atoms, and hydrocarbon aryl from 6 to 10 carbon atoms; and $x$ has a whole number value of at least 1 and not greater than 2000, said compound being linked through interconnecting polymerized vinyl linkages when $x$ is a plural integer.

2. A monomeric compound of the structure:

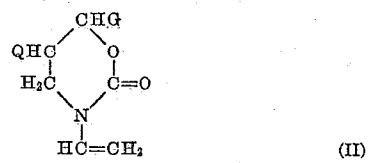

(II)

wherein Q is selected from the group consisting of hydrogen and methyl; G is selected from the group consisting of hydrogen, alkyl radicals that contain from 1 to 4 carbon atoms, monohaloalkyl radicals that contain from 1 to 4 carbon atoms and hydrocarbon aryl radicals that contain from 6 to 10 carbon atoms.

3. Monomeric N-vinyl-2-oxazinidinone of the Formula II wherein both Q and G are hydrogen.

4. An addition polymer of the formula:

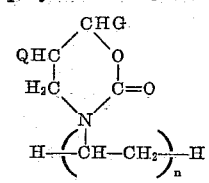

wherein Q is selected from the group consisting of hydrogen and methyl; G is selected from the group consisting of hydrogen, alkyl from 1 to 4 carbon atoms, monohaloalkyl from 1 to 4 carbon atoms, and monocyclic hydrocarbon aryl from 6 to 10 carbon atoms; and $n$ is an integer from 5 to about 2,000.

5. Homopolymeric N-vinyl-2-oxazinidinone according to claim 4, wherein both Q and G are hydrogen.

6. An addition polymer of the formula:

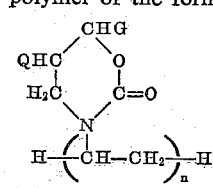

wherein Q is selected from the group consisting of hydrogen and methyl; G is selected from the group consisting of hydrogen, alkyl from 1 to 4 carbon atoms, monohaloalkyl from 1 to 4 carbon atoms, and monocyclic hydrocarbon aryl from 6 to 10 carbon atoms; and $n$ is a plural integer, said polymer having a number average molecular weight between about 10 thousand and about 200 thousand.

7. A hygroscopic, water-soluble addition polymer of the formula:

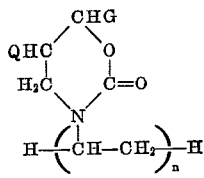

wherein Q is selected from the group consisting of hydrogen and methyl; G is selected from the group consisting of hydrogen, alkyl from 1 to 4 carbon atoms, monohaloalkyl from 1 to 4 carbon atoms, and monocyclic hydrocarbon aryl from 6 to 10 carbon atoms; and $n$ is a plural integer, said polymer having a Fikentscher K-value of from about 5 to about 100.

8. An addition copolymer consisting essentially of: (1) a material proportion of interpolymerized monomer of the Formula II; having, copolymerized therewith, (2) an interpolymerized monoethylenically unsaturated monomer selected from the group consisting of styrene, vinyl toluene, acrylonitrile, vinyl chloride, vinyl fluoride, vinylidene chloride, methyl acrylate, ethyl acrylate, methyl methacrylate, ethyl methacrylate, vinyl acetate, vinyl propionate, N-vinyl-2-pyrrolidone, N-vinyl-2-oxazodidinone, N-vinyl-5-methyl-2-oxazolidinone, and N-vinyl-3-morpholinone; said copolymer having a number average molecular weight between about 10 thousand and about 200 thousand.

9. The copolymer of claim 8, wherein the monomer of Formula II is N-vinyl-2-oxazinidinone.

References Cited in the file of this patent
UNITED STATES PATENTS

| | | |
|---|---|---|
| 2,818,362 | Drechsel | Dec. 31, 1957 |
| 2,818,399 | Drechsel | Dec. 31, 1957 |

OTHER REFERENCES

Waters: "Chemistry of Free Radicals," pages 134–6 (1946) (Oxford).

Laidler: "Chemical Kinetics," pages 274, 190–1, 238, 338, 339, 357–8. (1950) (McGraw Hill).

Noller: Chem. of Organic Compounds, page 785 (1957) W. B. Saunders Co.

UNITED STATES PATENT OFFICE
CERTIFICATE OF CORRECTION

Patent No. 3,030,339                                            April 17, 1962

William F. Tousignant et al.

It is hereby certified that error appears in the above numbered patent requiring correction and that the said Letters Patent should read as corrected below.

Column 2, line 63, for "ester" read -- ether --;
column 3, line 16, for "5 to 10" read -- 5 or 10 --;
column 6, line 55, after "PVOZ" insert -- product --.

Signed and sealed this 16th day of October 1962.

SEAL)
Attest:

RNEST W. SWIDER                                            DAVID L. LADD
Attesting Officer                                           Commissioner of Patents